United States Patent
Glienicke

(10) Patent No.: US 6,966,683 B2
(45) Date of Patent: Nov. 22, 2005

(54) BACKLIGHTING DEVICE

(75) Inventor: Haiko Glienicke, Bad Neustadt (DE)

(73) Assignee: Preh-Werke GmbH & Co. KG, Bad Neustadt a.d. Saale (DE)

( * ) Notice: Subject to any disclaimer, the term of this patent is extended or adjusted under 35 U.S.C. 154(b) by 164 days.

(21) Appl. No.: 10/390,693

(22) Filed: Mar. 19, 2003

(65) Prior Publication Data

US 2004/0022048 A1 Feb. 5, 2004

(30) Foreign Application Priority Data

Mar. 19, 2002 (DE) .......................................... 102 11 967

(51) Int. Cl.⁷ ................................................ F21V 7/04
(52) U.S. Cl. ...................... 362/602; 362/560; 362/283; 362/299; 362/300; 362/310; 362/311; 362/322; 362/329; 362/347
(58) Field of Search ............................ 362/31, 29, 556, 362/555, 560, 277, 283, 282, 299, 300, 309, 310, 311, 322, 329, 347, 583

(56) References Cited

U.S. PATENT DOCUMENTS 4,843,524 A * 6/1989 Krent et al. ................ 362/127
6,267,489 B1 * 7/2001 Yamamoto .................. 362/519
6,481,130 B1 * 11/2002 Wu ............................. 40/546

FOREIGN PATENT DOCUMENTS

| DE | 87 08 254.3 U1 | 9/1987 |
| DE | 44 45 388 A1 | 8/1995 |
| DE | 195 04 996 A1 | 8/1996 |
| DE | 197 41 585 C1 | 10/1998 |
| DE | 100 58 252 A1 | 8/2002 |
| EP | 0426433 A2 | 5/1991 |
| EP | 1180640 A1 | 2/2002 |
| WO | WO 94/16265 A1 | 7/1994 |
| WO | WO 02/43038 A2 | 5/2002 |

* cited by examiner

Primary Examiner—Sandra O'Shea
Assistant Examiner—Sharon Payne
(74) Attorney, Agent, or Firm—Birch, Stewart, Kolasch & Birch, LLP

(57) ABSTRACT

The proposed device uses a plastic of any color with a cavity introduced in it and preferably with a polished inner surface, instead of a reflector or a light guide, to utilize increased reflection with grazing incidence (large angle of incidence versus the normal to the surface). The light from a light source is transported to the symbol by reflection in this cavity and on the inner surface. The light source is preferably of a flat structure.

19 Claims, 2 Drawing Sheets

BACKLIGHTING DEVICE

This nonprovisional application claims priority under 35 U.S.C. § 119(a) on German Patent Application No. 102 11 967.8 filed in Germany on Mar. 19, 2002, which is herein incorporated by reference.

BACKGROUND OF THE INVENTION

1. Field of the Invention

The present invention relates to a backlighting device for a symbol of a control element.

2. Description of the Background Art

Conventional symbol backlights, for example for panel equipment, control elements, etc., have reflectors made of white plastic, light guides, or open air in case of direct lighting.

DE 92 16 107 U1 discloses a luminous indicator that has a light-conducting body that has a bulged S-shape viewed from the light output to the light input opening, to transfer a light beam to a symbol.

DE 199 43 589 A1 discloses a mushroom-shaped light guide wherein the light from a light source is coupled centrally into the mushroom and is fed through this to a scale. The light output is therewith off-center.

Optimal light transport cannot be realized by the prior art.

SUMMARY OF THE INVENTION

It is therefore an object of the present invention to provide a backlighting device that accomplishes effective utilization of light from a light source for a symbol to be illuminated, even with relatively large distances between the light source and the symbol and/or with relatively small symbols.

The concept underlying the present invention is to perform light transport, instead of a reflector or a light guide, by a plastic of any color with a cavity introduced in it and a preferably polished internal surface, wherein an increased reflection with grazing incidence (large angle of incidence versus the normal to the surface) is utilized. The light from a light source is transported to the symbol by reflection in this cavity and/or on the inner surface. The light source itself preferably has a flat design.

The angles of incidence of the light are kept as large as possible. Angles greater than 70 degrees are especially advantageous.

The cavity is composed of one or more subsurfaces, which are preferably subsurfaces of an ellipsoid. The semi-axes of the ellipsoidal subsurfaces are each chosen from the viewpoint of large angles of incidence of the light (versus the normal to the surface) and cover large ranges of emission space angle of the light sources in which the light intensity is high. The various subsurfaces can each have different semiaxes.

If reflector parts move with respect to one another, for example as in the illumination of an indicator symbol in a rotary knob with central illumination, rotation surfaces with an elliptical profile can also be used. Light source and symbol are each located in a focal point of the ellipse or of the ellipsoid.

The operating current of a light source can be reduced by this method. Economical LED's can also be used. By reducing the operating current, the life span of the light source is lengthened and the heat emission is reduced. Another benefit is that the region through which light is to be transmitted can be thicker.

By utilizing reflection with grazing incidence on the plastic surface, the optical properties of the reflector become less dependent on the coloring of the material. As such, darker colors can also be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
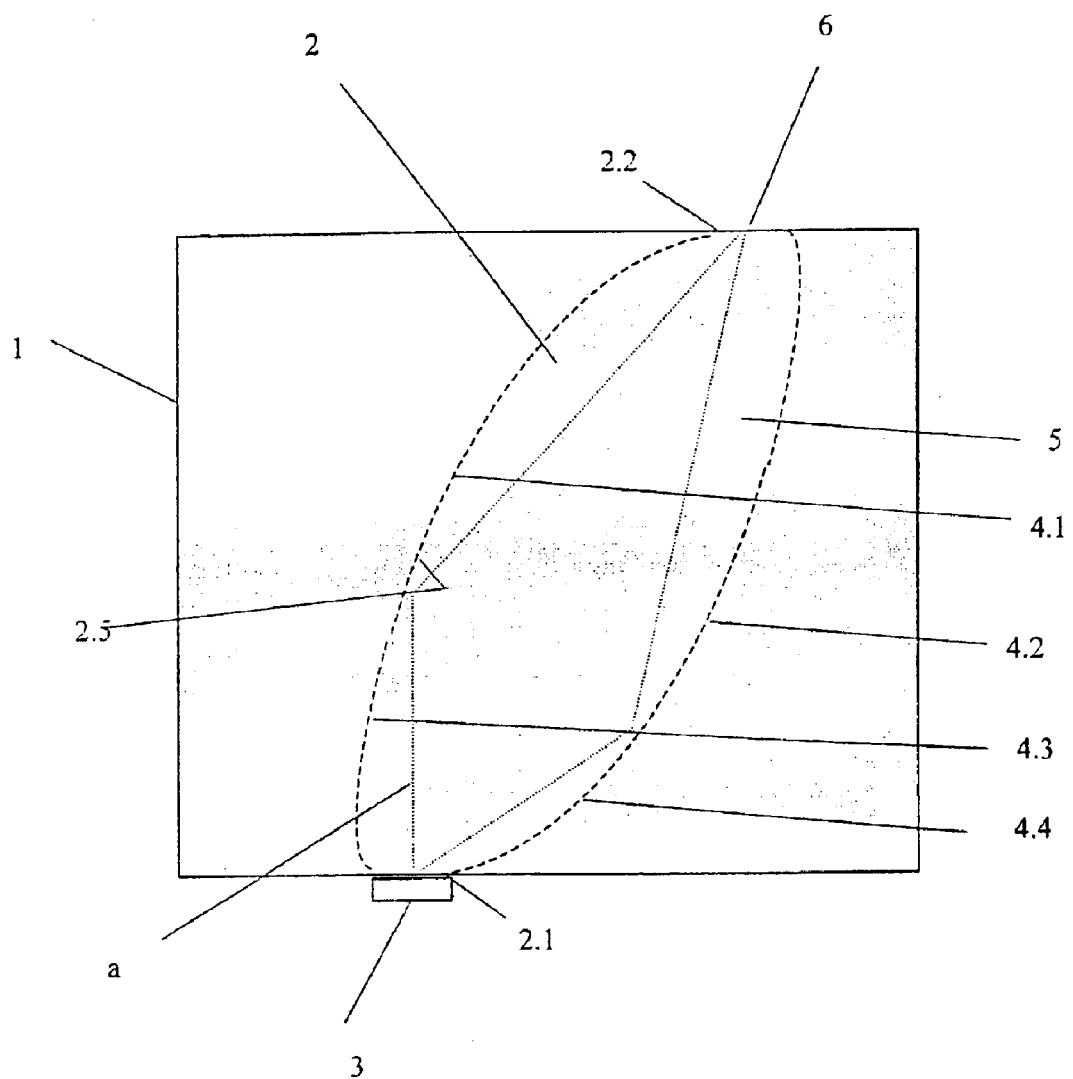
FIG. 1 is a diagrammatic sketch of a preferred embodiment of the present invention.

FIG. 1 illustrates in a diagrammatic sketch a plastic 1 having a cavity 2 embedded diagonally in the plastic 1. Beneath the plastic 1, which may also be colored, is a light source 3, such as an LED. Light a from the light source 3 is fed into the cavity 2 in a light input opening 2.1 of the cavity 2 and is transported to the symbol 6 by reflection on the subsurfaces 4.1, 4.2, and also 4.3 and 4.4 of the cavity 2, which is preferably constructed as an ellipsoid 5, with the light being outputted through a light output opening 2.2.

In case of a cavity 2 being oriented perpendicular to the light source 3, the symbol 6 that is to be illuminated is preferably directly above the light source 3.

Figure 2:
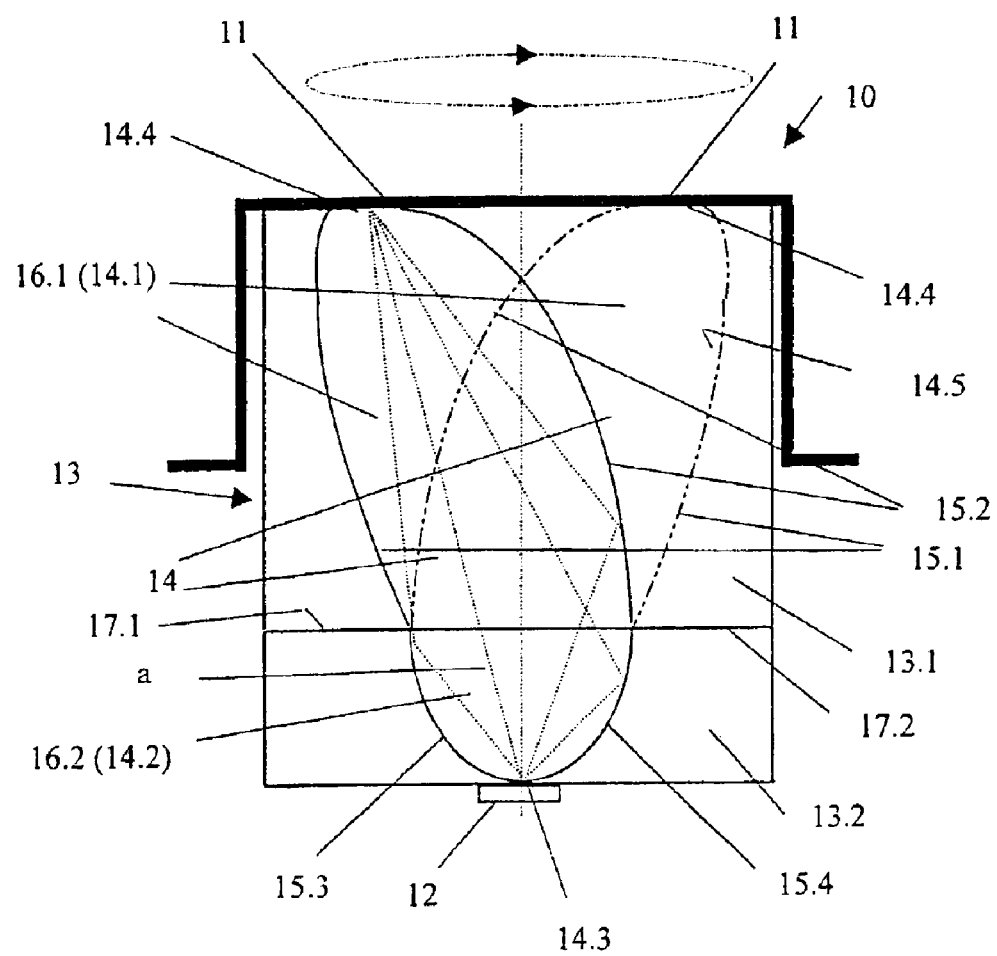
FIG. 2 illustrates an application of a rotary switch in accordance with a preferred embodiment of the present invention.

This symbol 6 may be a location or function indicator symbol of a control element, etc., which is to be illuminated by a centrally connected light source 12, which is shown in FIG. 2.

FIG. 2 shows in simplified illustration shows an application of a rotary switch or the like that has a symbol 11 in the rotary knob 10 that is to be illuminated by the light source 12. The parts of the rotary switch that perform this actual function are not shown in this illustration for reasons of clarity.

A plastic part 13 used for this application has an upper part 13.1, in which a part 14.1 and a part 14.2 are embedded, of a shared cavity 14, the upper part 13.1 being movable relative to a lower part 13.2. The two hollow parts 14.1 and 14.2 are separated by rotation surfaces 17.1 and 17.2. The cavity 14 includes reflector surfaces 15.1, 15.2, and 15.3, 15.4, which preferably form an ellipsoidal part 16.1 and an elliptical profile part 16.2, which are separated by the rotation surfaces 17.1, 17.2.

Light a from the light source 12 is fed into the cavity 14 through a light inlet opening 14.3 and is transported to the symbol 11 within the two profile parts 16.1 and 16.2 by reflection on the part and reflector surfaces 15.1–15.4. The symbol 11 is provided with light a through a light output opening 14.4.

When the rotary switch 10 is turned, the upper plastic part 13.1 turns with it, so that the profile part 16.1 also changes its position relative to the light source 12, as illustrated in FIG. 2.

The cavity 2 or 14 preferably has a polished inner surface 2.5 or 14.5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A backlighting device for a symbol of a control element, comprising:

a plastic part; and a light source, wherein a cavity is formed in the plastic part that extends from a light input opening for transmitting light from the light source through a light output opening and towards a lower surface of the symbol of the control element to backlight the symbol, and wherein a maximum diameter of the cavity is greater than a diameter of the light output opening, the diameter of the cavity and the diameter of the light output opening being parallel to one another.

2. The backlighting device according to claim 1, wherein the cavity is formed diagonally in the plastic part.

3. The backlighting device according to claim 1, wherein the cavity extends in the plastic part substantially perpendicular to the light source.

4. The backlighting device according to claim 1, wherein the cavity has a polished inner surface.

5. The backlighting device according to claim 1, wherein the angles of incidence of the light are greater than 70 degrees.

6. The backlighting device according to claim 1, wherein the cavity includes one or more subsurfaces.

7. The backlighting device according to claim 6, wherein the subsurfaces are of an ellipsoid.

8. The backlighting device according to claim 7, wherein semiaxes of the ellipsoid subsurfaces are chosen from viewpoints of an angle of incidence versus the normal to the subsurfaces, and cover ranges of an emission space angle of the light source.

9. The backlighting device according to claim 8, wherein the various subsurfaces can have different semiaxes.

10. The backlighting device according to claim 1, wherein the light source is below the light input opening such that the transmitted light is transmitted through the light input opening towards the light output opening.

11. The backlighting device according to claim 1, wherein the transmitted light is transmitted through the light output opening and directly to a lower surface of the symbol of the control element.

12. The backlighting device according to claim 1, wherein a center of the light input opening is offset from a center of the light output opening in a plane that extends perpendicularly from the light input opening through the cavity and towards the light output opening.

13. A backlighting device for a symbol of a control element, comprising:

a plastic part; and a light source, wherein a cavity is formed in the plastic part that extends from a light input opening for transmitting light from the light source to a light output opening, and wherein rotation surfaces are formed from reflector parts having cavities, which can move relative to one another, wherein the light source and a symbol are each located in a focal point of an ellipse or ellipsoid.

14. The backlighting device according to claim 13, wherein the rotation surfaces form two elliptical or ellipsoidal profile parts that are separate from one another.

15. A backlighting device for lighting a symbol of a rotary knob, the backlighting device comprising:

an upper plastic part and a lower plastic part, the upper plastic part and lower plastic part adapted to rotate with respect to each other at a rotation plane;

an upper cavity and a lower cavity being formed in the upper plastic part and the lower plastic part, respectively, such that an interior surface edge of the upper cavity is adjacent to an interior surface edge of the lower cavity at the rotation plane;

a light input opening formed in the lower plastic part for receiving light from a light source; and a light output opening formed in the upper plastic part for transmitting the light from the light source to the symbol, wherein the upper cavity and the lower cavity form a diagonally shaped ellipsoid, and wherein walls of the upper cavity and the lower cavity facilitate conveyance of the light from the light input opening to the light output opening.

16. The backlighting device according to claim 15, wherein the upper plastic part and the lower plastic part are formed of any selected color.

17. The backlighting device according to claim 15, wherein the walls of the upper cavity and the lower cavity are reflective.

18. The backlighting device according to claim 15, wherein the upper plastic part is able to rotate about the lower plastic part.

19. The backlighting device according to claim 18, wherein when the upper plastic part is rotated, the symbol changes a position with respect to the light source.

\* \* \* \* \*